United States Patent [19]

Clayton

[11] 4,304,451

[45] Dec. 8, 1981

[54] INTERCONNECTION TECHNIQUE FOR DOWNHOLE INSTRUMENTATION

[75] Inventor: Richard B. Clayton, Seabrook, Tex.

[73] Assignee: General Electric Company, Philadelphia, Pa.

[21] Appl. No.: 972,051

[22] Filed: Dec. 20, 1978

[51] Int. Cl.[3] .......................... H01R 13/54; F16L 9/22

[52] U.S. Cl. .................................. 339/75 M; 339/141; 138/100; 340/856; 403/341

[58] Field of Search .................................... 339/15-16, 339/22-23, 47-49, 75 R, 75 M, 75 P, 191-205, 107, 141, 208; 340/850, 853, 856, 857; 285/419; 175/41; 166/65 R, 65 M, 66; 403/341, 286; 138/100, 108; 174/37-47

[56] References Cited

U.S. PATENT DOCUMENTS

| | | | |
|---|---|---|---|
| 384,860 | 6/1888 | Meehan | 174/47 X |
| 1,255,264 | 2/1918 | Wright | 339/141 X |
| 2,437,358 | 3/1948 | Mowery | 339/89 M |
| 2,969,919 | 1/1961 | Kornberg | 339/22 R X |
| 3,080,544 | 3/1963 | Stott et al. | 339/48 |
| 3,821,690 | 6/1974 | Small | 339/75 R |

*Primary Examiner*—Joseph H. McGlynn
*Assistant Examiner*—John S. Brown
*Attorney, Agent, or Firm*—Allen E. Amgott; Raymond H. Quist

[57] ABSTRACT

Multiple electrical connections between circuits in axially displaced housings are made by mounting the connectors so that they are at right angles to the axis of the housings.

2 Claims, 3 Drawing Figures

INTERCONNECTION TECHNIQUE FOR DOWNHOLE INSTRUMENTATION

BACKGROUND OF THE INVENTION

This invention relates generally to multiple pin electrical connectors and more particularly to connectors to be used in cylindrical housings.

In earth drilling operations it is customary to send sensors of various types into the well bore for the purpose of determining various conditions. Associated with the sensors are electronic circuits which, for example, convert analog measurements to digital form and transmit them to the surface.

The narrow size of the well bore and the requirement that this equipment not unduly impede the passage of drilling mud have necessitated that a slim cylindrical housing be used to contain the sensors and circuitry (hereafter "logging system"). To avoid custom designing completely every logging system to meet particular user requirements, it has been found desirable to have certain standard modules, such as a transmitter, power supply, etc., contained in a separate housing which is then connected to other housings. It has been found, however, that the circular cross-section area available for a conventional connector was inadequate for the number of connections needed.

SUMMARY OF THE INVENTION

Means for making multiple electrical connections between circuits in axially displaced cylindrical housings are disclosed. Each housing is formed of nominally semicylindrical main frame and cover members. The main frames of each housing are extended and support connector elements which are mounted perpendicular to the housing axis.

DESCRIPTION OF THE PREFERRED EMBODIMENT

Figure 1:
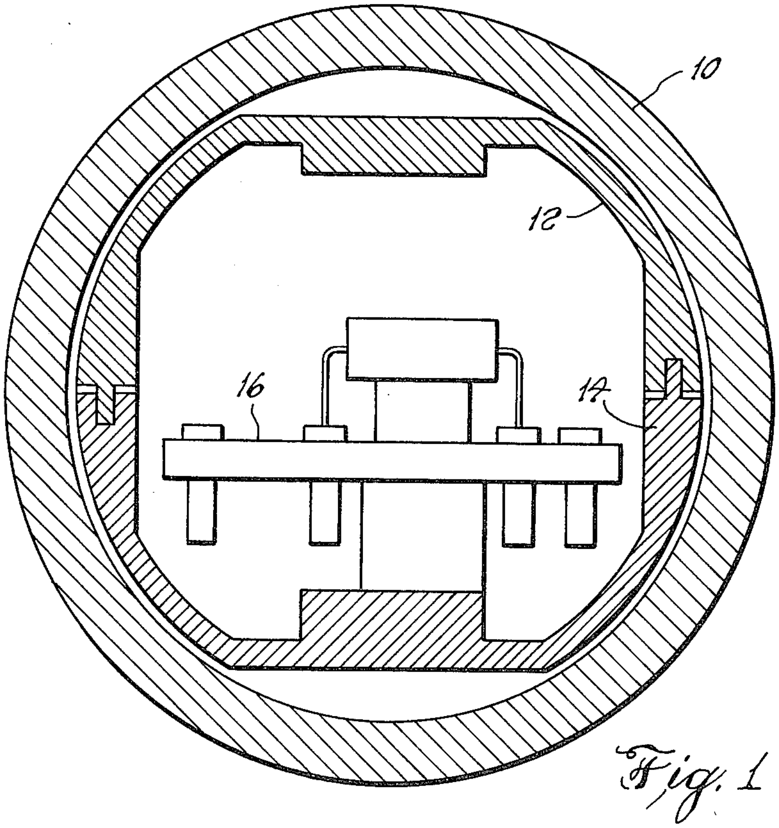
FIG. 1 is a cross-section showing a housing for circuitry.

Referring to FIG. 1, pressure housing 10 is provided to protect the apparatus from the severe environment of the well bore. Residing in pressure housing 10 is a norminally cylindrical housing formed of semicylindrical frame 14 and and semicylindrical cover 12. Mounted on frame 14 is circuitry 16 of any desired type. As shown, frame 14 and cover 12 are generally similar although frame 14 may have a sturdier base for support of the circuitry.

Figure 2:
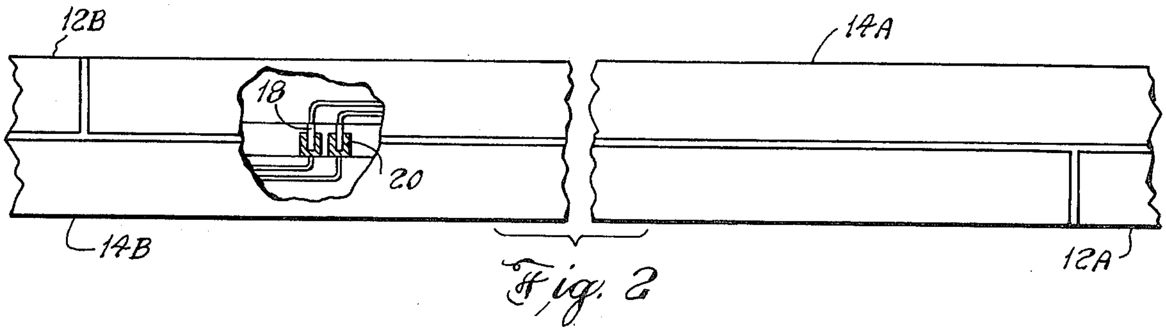
FIG. 2 is an elevation showing the connector in a cutaway.

Referring next to FIG. 2, the connection between two housings of the type of FIG. 1 will be described. Cover 12A is shown terminating while frame 14A extends beyond it. In a complementary fashion, cover 12B terminates while frame 14B extends beyond it. Extending perpendicularly from the extended frame 14A is conductive pin 18. Extending perpendicularly from extended main frame 14B is a conductive female member 20. Pin 18 and female member 20 form an electrical connection when engaged, and are representative of any desired number of connections which can be made between extended frames 14A and 14B. Each of said pins 18 being connected to circuitry in the housing formed by cover 12A and frame 14A; and each of the female members 20 being similarly connected to circuitry in the housing formed by cover 12B and frame 14B.

Figure 3:
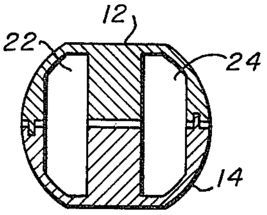
FIG. 3 is a cross-section illustrating the symmetrical configuration employed to provide conduits for carrying electric conductors.

As shown by FIG. 3 conduits 22 and 24 can be provided within the mating main frames 14 and covers 12 to hold conductors.

Although a particular embodiment of an interconnection arrangement has been illustrated and described, it will be obvious that changes and modifications can be made without departing from the spirit of the invention and the scope of the appended claims.

I claim:

1. A connector arrangement for making electrical connections between apparatus contained in two cylindrical housings having a common longitudinal axis, wherein the cylindrical housings are formed of two semicylindrical parts with one part constituting a frame member upon which the apparatus may be mounted and the other part a cover member, said connector arrangement comprising:

- extensions from the two cylindrical housings of the semicylindrical frame member of each;
- said extensions being of the same length and so positioned with respect to each other that they form a complete cylinder having the same diameter as said housings;
- a plurality of conductive male members extending from the extension of one of said frame members in a direction perpendicular to the longitudinal axis;
- a corresponding plurality of conductive female members extending from the extension of the other frame member in a direction perpendicular to the longitudinal axis;
- each of said female members positioned to mate with a corresponding male member; and
- conductive means for connecting each of said male and female members to a circuit mounted in its associated housing.

2. Connecting means in accordance with claim 1 wherein:

- said cylindrical housings are contained in a pressure housing having a constant external diameter.

* * * * *